(12) United States Patent
Kudoh

(10) Patent No.: US 8,289,627 B2
(45) Date of Patent: Oct. 16, 2012

(54) LENS BARREL THAT REALIZES MINIATURIZATION, AND IMAGE PICKUP APPARATUS

(75) Inventor: Tomoyuki Kudoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 89 days.

(21) Appl. No.: 12/945,925

(22) Filed: Nov. 15, 2010

(65) Prior Publication Data

US 2011/0122509 A1    May 26, 2011

(30) Foreign Application Priority Data

Nov. 20, 2009  (JP) ................................. 2009-264734

(51) Int. Cl.
*G02B 15/14*    (2006.01)
*G02B 7/02*    (2006.01)

(52) U.S. Cl. .......................... 359/700; 359/826; 359/694

(58) Field of Classification Search .......... 359/694–704, 359/811–830

See application file for complete search history.

(56) References Cited

U.S. PATENT DOCUMENTS

| 5,144,490 | A | * | 9/1992 | Yamanouchi | ................. 359/694 |
| 5,978,156 | A |   | 11/1999 | Okada et al. | |

FOREIGN PATENT DOCUMENTS

JP    10-039188 A    2/1998

* cited by examiner

*Primary Examiner* — Mohammed Hasan
(74) *Attorney, Agent, or Firm* — Fitzpatrick, Cella, Harper & Scinto

(57) ABSTRACT

A lens barrel that causes base portions of cam followers in a first optical member and a second optical member to follow a single straight-ahead movement guide groove along an optical axis even when circumferential phases of the cam followers are staggered, so that the optical members can move straight ahead while being inhibited from rotating. The base portion of the cam follower of one of the first optical member and the second optical member has a slide portion that is guided along both inner wall surfaces of a straight-ahead movement guide groove which face each other in a circumferential direction of a straight-ahead moving cylinder. The slide portion has a guide surface that guides the base portion of the cam follower of the other one of the first optical member and the second optical member in the direction of the optical axis.

5 Claims, 7 Drawing Sheets

LENS BARREL THAT REALIZES MINIATURIZATION, AND IMAGE PICKUP APPARATUS

BACKGROUND OF THE INVENTION

1. Field of the Invention

The present invention relates to a lens barrel that is provided in an image pickup apparatus such as a film camera or a digital camera, and an image pickup apparatus having the lens barrel.

2. Description of the Related Art

In conventional lens barrels of this type, with increases in zooming magnification, the number and strokes of optical members such as lens groups have increased, and the layout of cam grooves arranged in an inner peripheral surface of a cam cylinder according to movement of each optical member along an optical axis has become more complicated.

Also, to enable a plurality of optical members straight ahead while inhibiting them from rotating, straight-ahead movement guide grooves that guide respective base portions of cam followers arranged in the plurality of optical members are formed in a straight-ahead moving cylinder. Thus, due to an increase in the number of straight-ahead movement guide grooves, machining of the straight-ahead moving cylinder becomes more complicated, and also, the strength of the straight-ahead moving cylinder deteriorates, causing engagement of the base portions of the cam followers and the straight-ahead movement guide grooves to become unstable.

Accordingly, there has conventionally been proposed a technique that base portions of cam followers in a plurality of optical members are caused to follow a single straight-ahead movement guide groove along an optical axis so that the plurality of optical members can move straight ahead while being inhibited from rotating (Japanese Laid-Open Patent Publication (Kokai) No. H10-39188).

However, according to the technique disclosed in Japanese Laid-Open Patent Publication (Kokai) No. H10-39188, the base portions of the cam followers in the plurality of optical members which follow the single straight-ahead movement guide groove along the optical axis have to be identical in shape, and also, the cam followers in the plurality of optical members have to be identical in circumferential phase.

For this reason, the cam followers in the plurality of optical members overlap in the direction of the optical axis, and the length of a lens barrel in the direction of the optical axis increases accordingly, which hinders miniaturization of an image pickup apparatus.

SUMMARY OF THE INVENTION

The present invention provides a lens barrel that causes base portions of cam followers in a plurality of optical members to follow a single straight-ahead movement guide groove along an optical axis even when circumferential phases of the cam followers are staggered, so that the plurality of optical members can move straight ahead while being inhibited from rotating, as well as an image pickup apparatus having the lens barrel.

Accordingly, a first aspect of the present invention provides a lens barrel comprising a first optical member configured to have a cam follower provided on an outer periphery thereof, a second optical member configured to be disposed away from the first optical member in a direction of an optical axis, and have a cam follower provided on an outer periphery thereof, and a straight-ahead moving cylinder configured to be formed with a straight-ahead movement guide groove that guides base portions of the respective cam followers of the first optical member and the second optical member in the direction of the optical axis, and move straight ahead in the direction of the optical axis while being inhibited from rotating, wherein in a base portion of the cam follower of one of the first optical member and the second optical member, there is provided a slide portion that is guided along both inner wall surfaces of the straight-ahead moving cylinder which face each other in a circumferential direction of the straight-ahead moving cylinder, and the slide portion is provided with a guide portion that guides a base portion of the cam follower of the other one of the first optical member and the second optical member in the direction of the optical axis.

Accordingly, a second aspect of the present invention provides an image pickup apparatus with a lens barrel including a zoom mechanism that moves in a direction of an optical axis to change shooting magnifications when a state of the lens barrel changes between a shooting state and a retracted state, comprising the lens barrel as the above described lens barrel.

According to the present invention, even when circumferential phases of the cam followers are staggered, the base portions of the cam followers in the plurality of optical members are caused to follow the single straight-ahead movement guide groove along the optical axis so that the plurality of optical members can move straight ahead while being inhibited from rotating.

Further features of the present invention will become apparent from the following description of exemplary embodiments (with reference to the attached drawings).

BRIEF DESCRIPTION OF THE DRAWINGS

FIG. 2 is an external perspective view of the digital camera in FIG. 1 with its power ON.

DESCRIPTION OF THE EMBODIMENTS

The present invention will now be described in detail with reference to the drawings showing an embodiment thereof.

Figure 1:
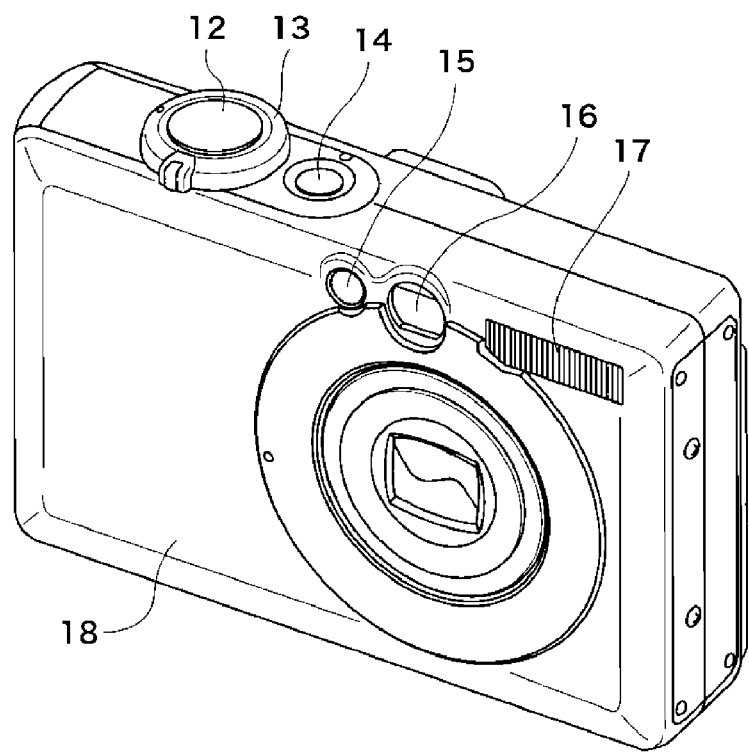
FIG. 1 is an external perspective view of a digital camera, which is an exemplary embodiment of an image pickup apparatus having a lens barrel according to the present invention, from an anterior view.
Figure 2:
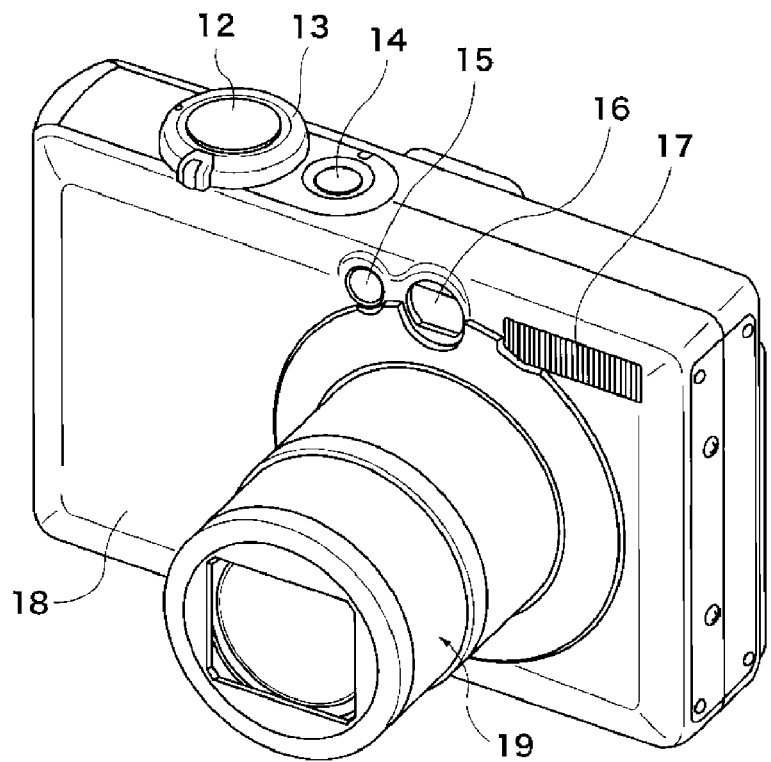
Figure 3:
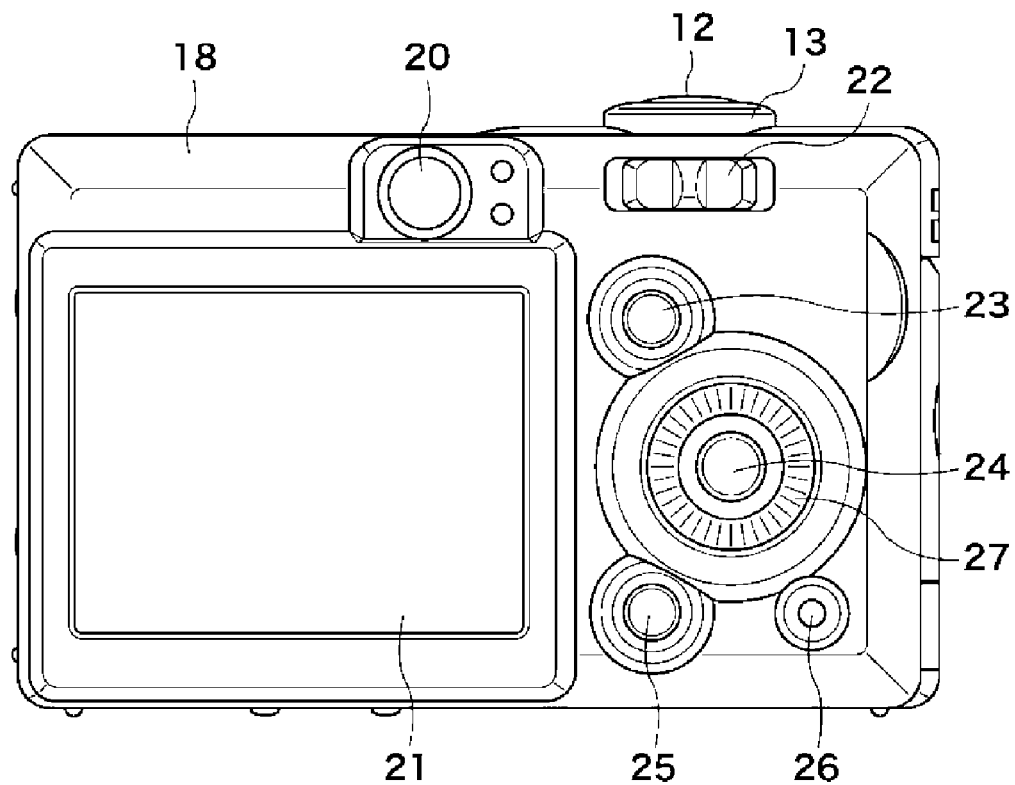
FIG. 3 is a rear view of FIG. 1.
Figure 4:
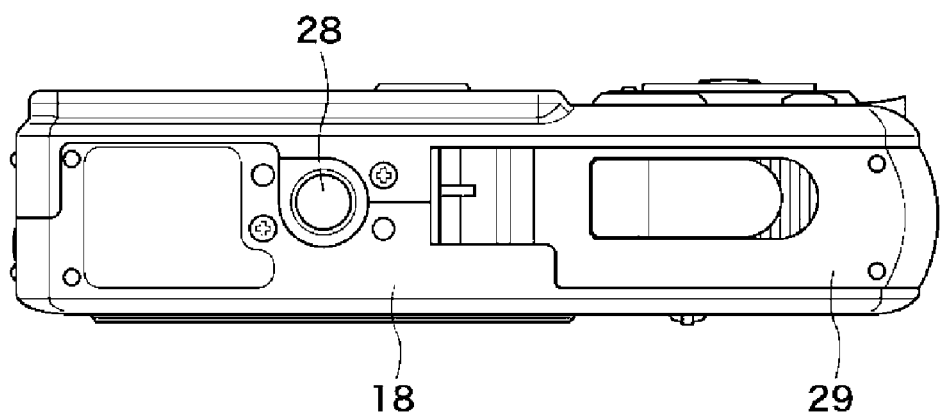
FIG. 4 is a bottom view of FIG. 1.

FIG. 1 is an external perspective view of a digital camera, which is an exemplary embodiment of an image pickup apparatus having a lens barrel according to the present invention, from an anterior view, FIG. 2 is an external perspective view of the digital camera in FIG. 1 with its power ON, FIG. 3 is a rear view of FIG. 1, and FIG. 4 is a bottom view of FIG. 1.

Referring to FIGS. 1 and 2, the digital camera 18 according to the present embodiment has a zoom mechanism that moves along an optical axis between a shooting state and a retracted state to change shooting magnifications. In a front face of the digital camera 18, there are disposed a finder 16 that determines a composition of a subject, an auxiliary light source 15 for use in performing photometry and ranging, a strobe 17, and a lens barrel 19. In an upper face of the digital camera 18, there are disposed a release button 12, a power switching button 14, and a zoom switch 13.

Also, as shown in FIG. 3, in a rear face of the digital camera 18, there are disposed a plurality of operation members 22 to 27, a display 21 such as an LCD, and a finder eyepiece 20. Further, as shown in FIG. 4, in a bottom face of the digital camera 18, there are disposed a tripod mounting portion 28, and a cover 29 for a memory card drive 42 (see FIG. 5) and a battery insertion portion (not shown).

Figure 5:
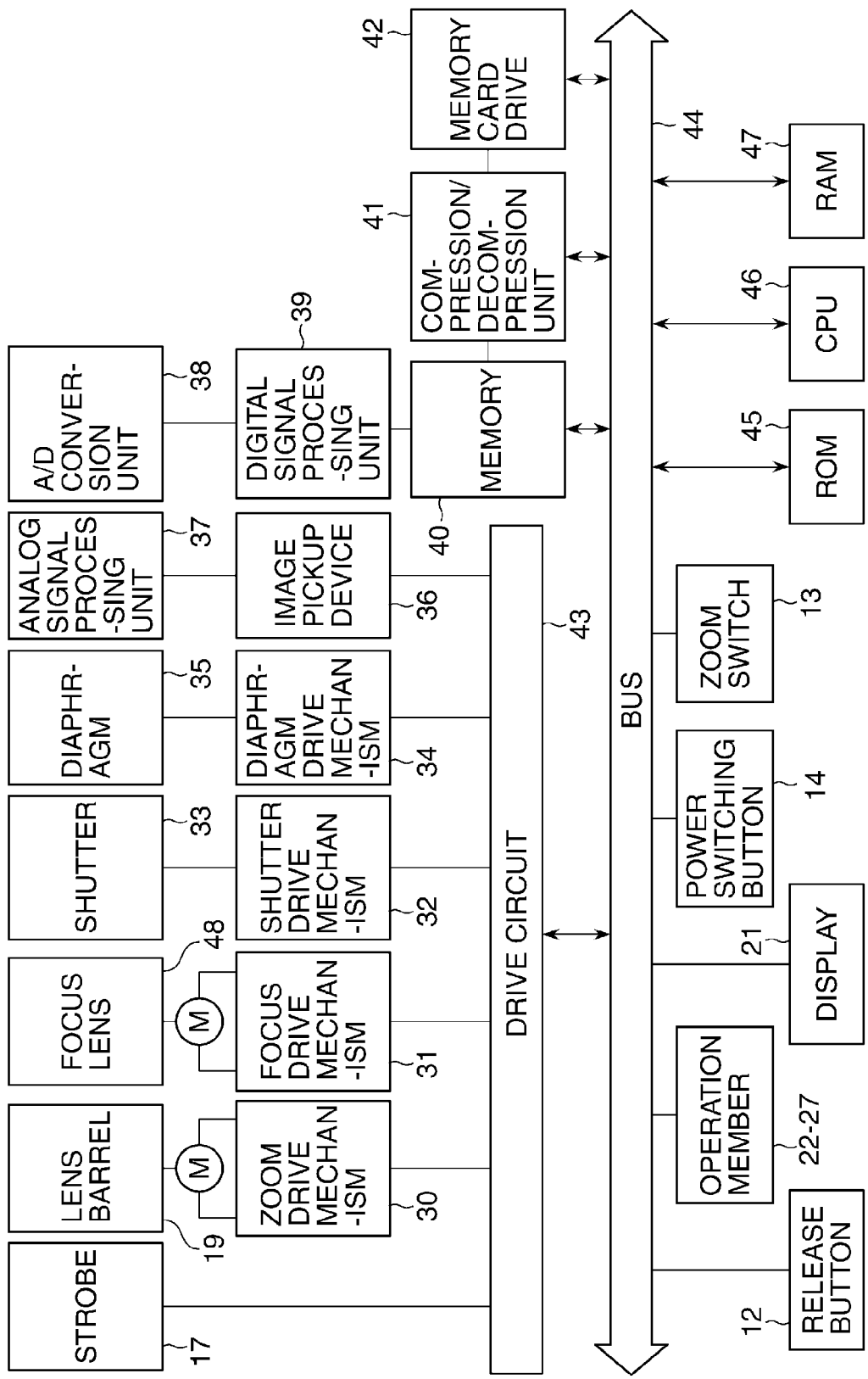
FIG. 5 is a block diagram schematically showing a hardware arrangement of the digital camera.

FIG. 5 is a block diagram schematically showing a hardware arrangement of the digital camera 18 according to the present embodiment.

To a buss 44 are connected a CPU 46, a ROM 45, a RAM 47, the release button 12, the operation members 22 to 27, the display 21, the power switching button 14, the zoom switch 13, a memory 40, a compression/decompression unit 41, the memory card drive 42, and a drive circuit 43.

To the drive circuit 43 are connected a zoom drive circuit 30 that zoom-drives the lens barrel 19, a focus drive mechanism 31 that drives a focus lens 48 (see FIG. 6), a shutter drive mechanism 32 that drives a shutter 33, and a diaphragm drive mechanism 34 that drives a diaphragm 35.

To the drive circuit 43 are also connected an image pickup device 36, such as a CCD sensor or a CMOS sensor, and the strobe 17. Operation of the units connected to the drive circuit 43 is controlled via the drive circuit 43 in accordance with signals from the CPU 46.

The ROM 45 stores various control programs and others, and the RAM 47 stores data required for the control programs. An analog signal processing unit 37 carries out an analog process on image data output from the image pickup device 12, and outputs the resulting analog data to an A/D conversion unit 38.

The A/D conversion unit 38 converts the analog data captured from the image pickup device 36 to digital data, and outputs the digital data to a digital signal processing unit 39. The digital signal processing unit 39 carries out a predetermined process on the digital data obtained as a result of the conversion by the A/D conversion unit 38, and outputs the resulting data as image data to the memory 40.

The image data stored in the memory 40 is subjected to a compression process and the like such as JPEG compression or TIFF compression by the compression/decompression unit 41 in accordance with operation of the operation member 23, and then output to and stored in a memory card inserted in the memory card drive 42.

Moreover, the image data stored in the memory 40 or the image data stored in the memory card drive 42 may be decompressed by the compression/decompression unit 41, and then displayed on the display 21 via the buss 44. When a user looks at the image displayed on the display 21 and determines that it is unnecessary, it may be deleted through operation of the operation button 25.

Figure 6:
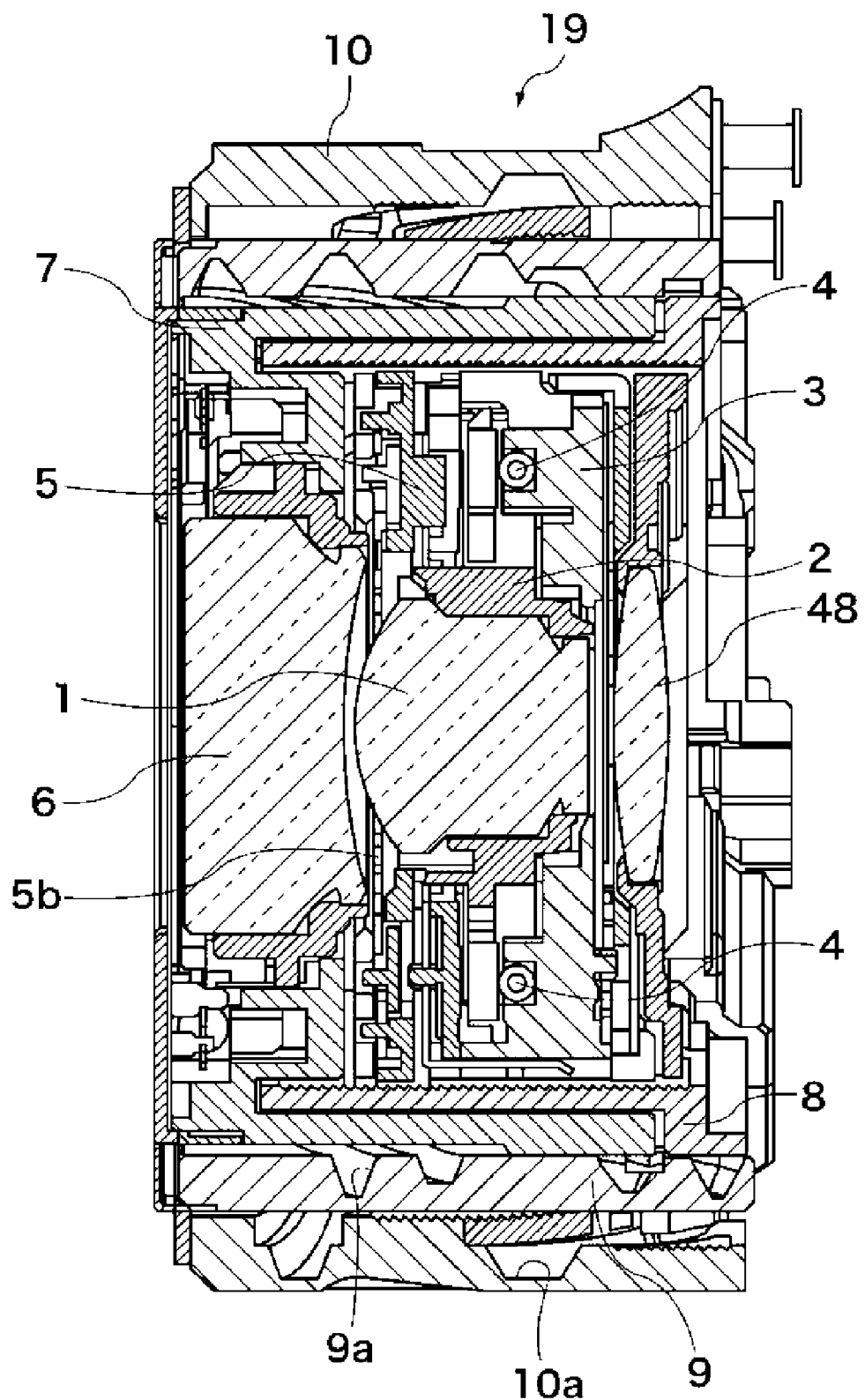
FIG. 6 is a cross-sectional view of the lens barrel in a retracted state.
Figure 7:
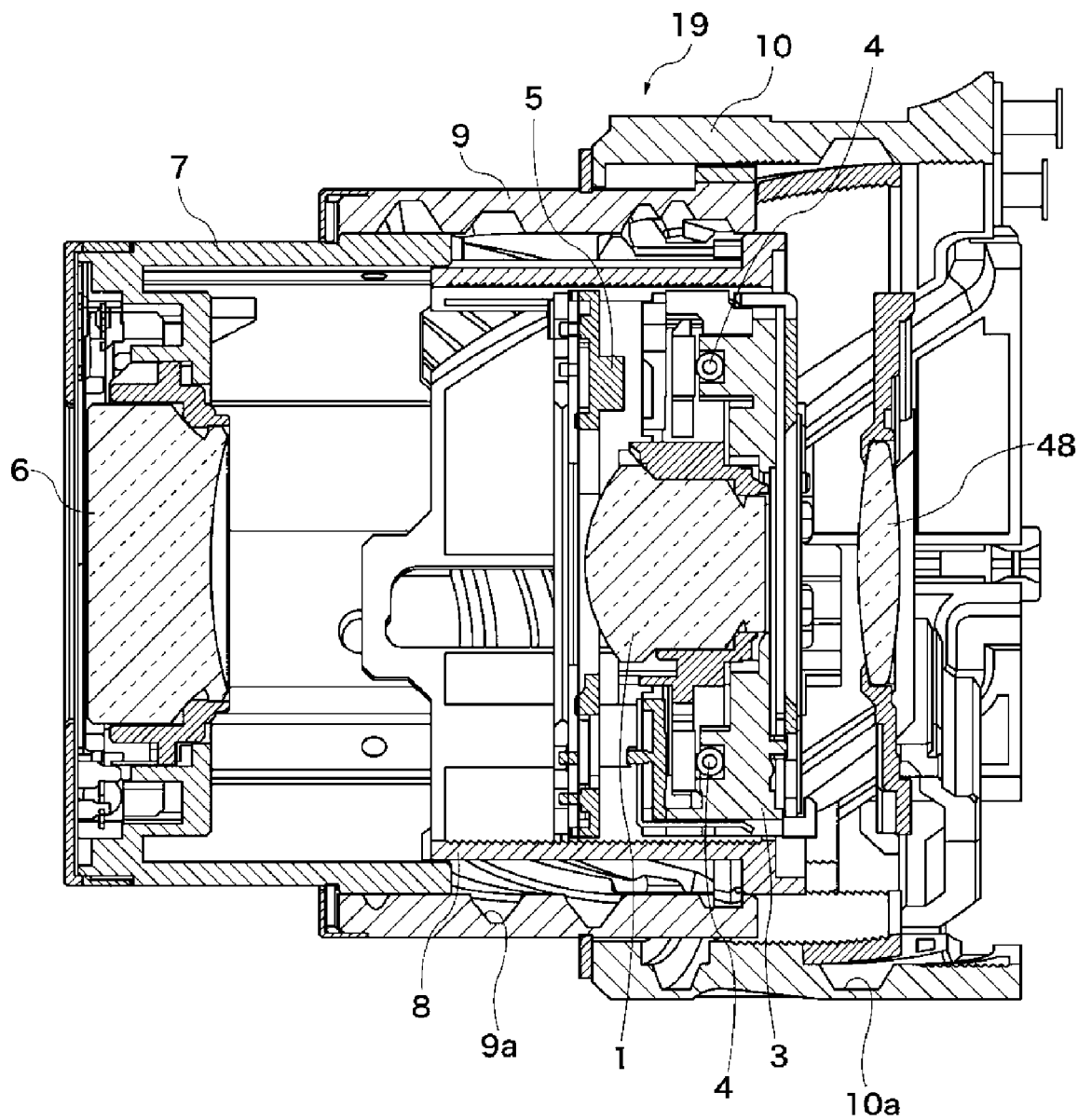
FIG. 7 is a cross-sectional view of the lens barrel in a shooting state.
Figure 8:
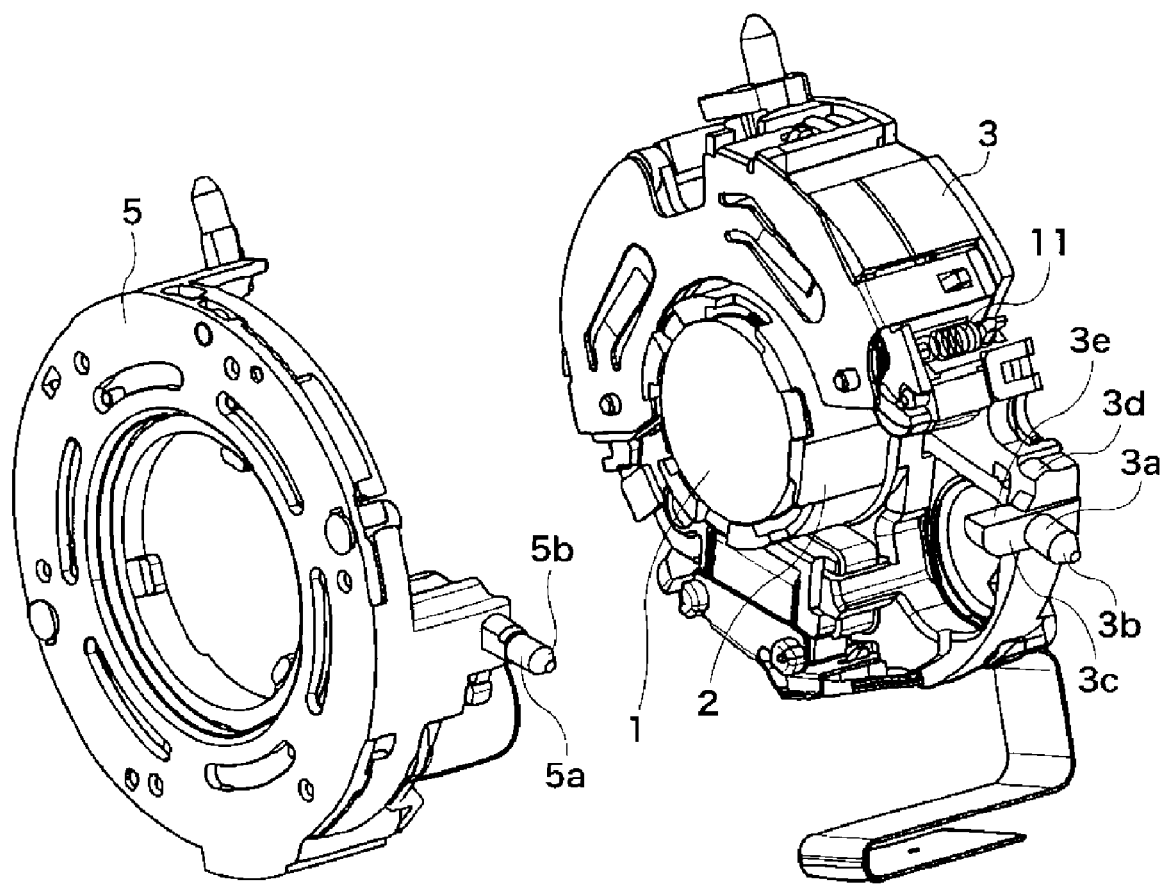
FIG. 8 is an exploded perspective view of a first optical member and a second optical member.
Figure 9:
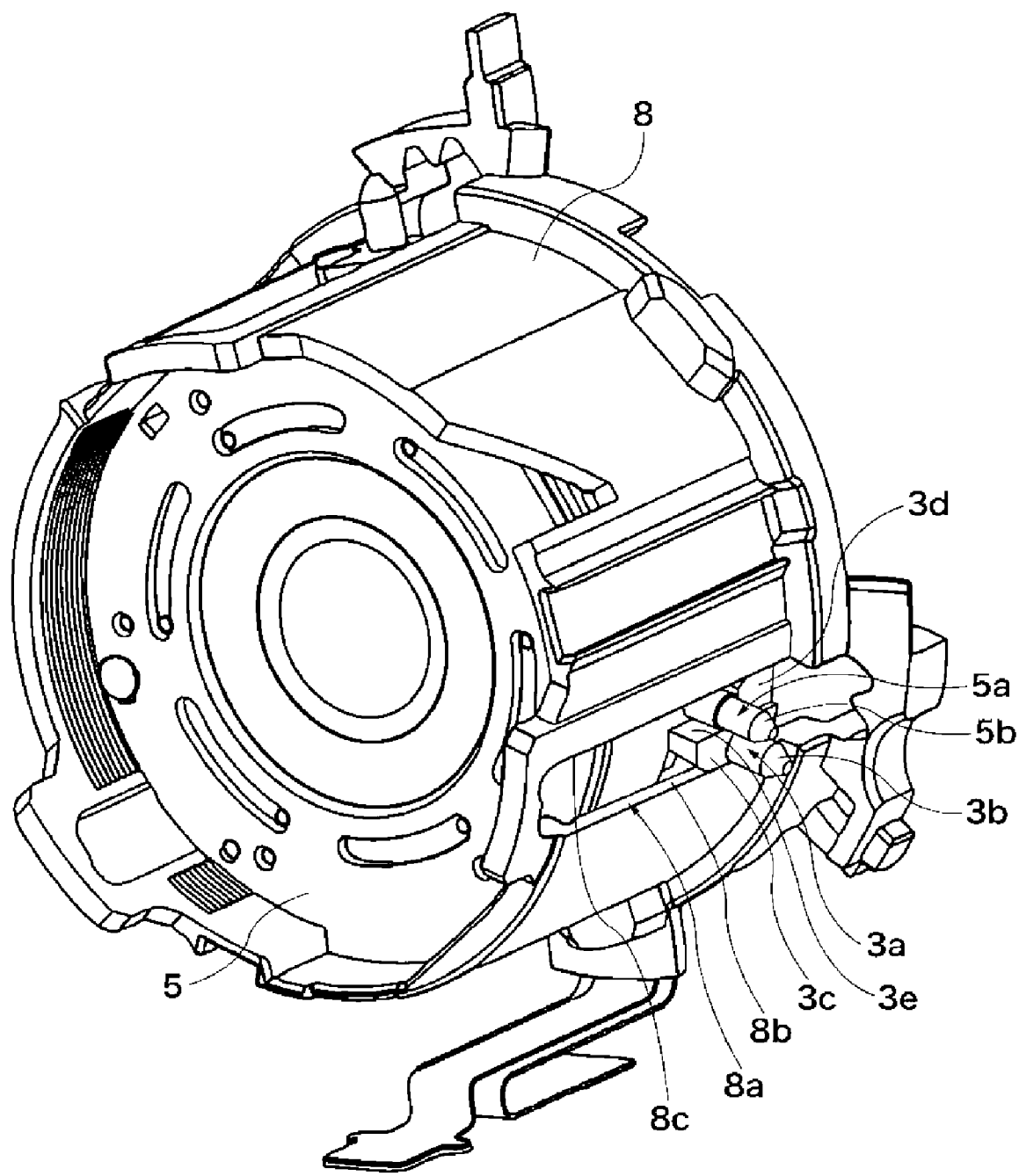
FIG. 9 is a perspective view of the first optical member and the second optical member incorporated on an inner peripheral side of a straight-ahead moving cylinder.

Referring next to FIGS. 6 to 9, a description will be given of the lens barrel 19. FIG. 6 is a cross-sectional view of the lens barrel 19 in the retracted state, FIG. 7 is a cross-sectional view of the lens barrel 19 in the shooting state, FIG. 8 is an exploded perspective view of a first optical member 3 and a second optical member 5, and FIG. 9 is a perspective view of the first optical member 3 and the second optical member 5 incorporated on an inner peripheral side of a straight-ahead moving cylinder 8.

Referring to FIGS. 6 and 7, the lens barrel 19 has the first optical member 3 having a lens antivibrating function, and the second optical member 5 that is disposed in front of the first optical member 3 in the direction of the optical axis and functions as an iris diaphragm.

An antivibration lens holding frame 2 holding an antivibration lens 1 is fitted in an opening in a central part of the first optical member 3. The antivibration lens holding frame 2 is urged toward the first optical member 3 via a plurality of balls 4 by a spring 11 (see FIG. 8).

Two magnets (not shown) are integrally disposed in the antivibration lens holding frame 2, and two coils (not shown) corresponding to the two magnets are integrally disposed in the first optical member 3. Upon detecting an amount of camera vibration, a control unit (not shown) passes electric current through the coils according to the amount of camera vibration, causing the antivibration lens holding frame 2 to operate.

Next, a description will be given of the zoom mechanism of the lens barrel 19. A first-group lens 6 is disposed forward of the antivibration lens 1 in the direction of the optical axis, and held by a first-group lens holding frame 7. The first-group lens holding frame 7 and the first optical member 3 are held by the straight-ahead moving cylinder 8, and a cam cylinder 9 is disposed on an outer peripheral side of the first-group lens holding frame 7.

Cam followers are disposed in each of the first-group lens holding frame 7 and the first optical member 3, and the cam followers move in the direction of the optical axis while being in engagement with cam grooves 9a formed in an inner peripheral surface of the cam cylinder 9. The cam follower of the first optical member 3 will be described later.

The cam cylinder 9 and the straight-ahead moving cylinder 8 are configured as a substantially integral unit through bayonet engagement. While rotating, the cam cylinder 9 moves in the direction of the optical axis in response to movement of a cam groove 10a of a fixed cylinder 10 provided on an outer periphery of the cam cylinder 9. The straight-ahead moving cylinder 8 moves straight ahead in the direction of the optical axis while being inhibited from rotating by the fixed cylinder 10.

Referring to FIGS. 8 and 9, on an outer periphery of the first optical member 3, three cam followers 3a are disposed at substantially equal intervals in a circumferential direction, and on an outer periphery of the second optical member 5, three cam followers 5a are disposed at substantially equal intervals in a circumferential direction. In the present embodiment, the first optical member 3 corresponds to one exemplary optical member of the present invention, and the second optical member 5 corresponds to the other one exemplary optical member of the present invention.

The cam followers 3a and 5a penetrate through straight-ahead movement guide grooves 8a formed in the straight-ahead moving cylinder 8 along the direction of the optical axis, and pin portions 3b and 5b at distal ends of the cam followers 3a and 5a project out from an outer peripheral portion of the straight-ahead moving cylinder 8. The projected pin portions 3b and 5b are engaged with the respective cam grooves 9a of the cam cylinder 9.

Referring to FIG. 9, in a base portion of each cam follower 3a, there are provided a slide portion 3c that is guided in the direction of the optical axis along an inner wall surface 8b of the straight-ahead movement guide groove 8a on one side in the circumferential direction of the straight-ahead moving cylinder 8, and a slide portion 3d that is guided in the direction of the optical axis along an inner wall surface 8c of the straight-ahead movement guide groove 8a on the other side in the circumferential direction of the straight-ahead moving cylinder 8. Thus, the slide portions 3c and 3d provided in the base portion of the cam follower 3a are guided in the direction of the optical axis along the inner wall surfaces 8b and 8c of the straight-ahead movement guide groove 8a which face each other in the circumferential direction of the straight-ahead moving cylinder 8.

Moreover, the slide portion 3c is disposed in a manner extending forward of the slide portion 3d in the direction of the optical axis, and a guide surface 3d that guides a base portion of the cam follower 5a in the direction of the optical axis is formed on a surface of the slide portion 3c which does not face the inner wall surface 8b. The guide surface 3e corresponds to an exemplary guide portion of the present invention. The base portion of the cam follower 5a is guided in the direction of the optical axis by the inner wall surface 8c of the straight-ahead moving guide groove 8a as well.

As a result, even when circumferential phases of the cam followers 3a and 5a in the first optical member 3 and the second optical member 5 are staggered, the base portions of the cam followers 3a and 5a can be caused to follow the single straight-ahead moving guide groove 8a in the direction of the optical axis.

The pin portions 3b and 5b of the cam followers 3a and 5a following the cam grooves 9a of the cam cylinder 9 in the retracted state (FIG. 6) and the shooting state (FIG. 7) of the lens barrel 19 cause the first optical member 3 and the second optical member 5 to move relatively to each other in the direction of the optical axis while, inhibiting them from rotating.

In the retracted state of the lens barrel 19, the first optical member 3 and the second optical member 5 are close to each other, and in the shooting state of the lens barrel 19, the first optical member 3 and the second optical member 5 are away from each other. To increase the relative movement distance of the first optical member 3 and the second optical member 5, the length of the guide surface 3e provided in the cam follower 3a of the first optical member 3 should be increased in the direction of the optical axis.

As described above, in the present embodiment, the base portions of the cam followers 3a and 5a in the first optical member 3 and the second optical member 5 can be caused to follow the single straight-ahead movement guide groove 8a in the direction of the optical axis. As a result, the number of straight-ahead movement guide grooves 8a can be decreased, and degradation in the strength of the straight-ahead moving cylinder 8 can be prevented.

Moreover, because circumferential phases of the cam followers 3a and 5a in the first optical member 3 and the second optical member 5 can be staggered, the cam followers 3a and 5a do not overlap in the direction of the optical axis. As a result, the length of the lens barrel 19 in the direction of the optical axis can be reduced, and miniaturization of a digital camera can be realized.

Although in the above described embodiment, an iris diaphragm is used as an example of the second optical member 5, the present invention is not limited to this, but the second optical member 5 may be used as a lens holding frame, and both the first optical member 3 and the second optical member 5 may be used as lens holding frames.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-264734 filed Nov. 20, 2009, which is hereby incorporated by reference herein in its entirety.

What is claimed is:

1. A lens barrel comprising:
   a first optical member configured to have a cam follower provided on an outer periphery thereof;
   a second optical member configured to be disposed away from said first optical member in a direction of an optical axis, and have a cam follower provided on an outer periphery thereof; and
   a straight-ahead moving cylinder configured to be formed with a straight-ahead movement guide groove that guides base portions of the respective cam followers of said first optical member and said second optical member in the direction of the optical axis, and to move straight ahead in the direction of the optical axis while being inhibited from rotating,
   wherein in a base portion of the cam follower of one of said first optical member and said second optical member, there is provided a slide portion that is guided in the direction of the optical axis along both inner wall surfaces of said straight-ahead movement guide groove which face each other in a circumferential direction of said straight-ahead moving cylinder, and
   the slide portion is provided with a guide portion that guides a base portion of the cam follower of the other of said first optical member and said second optical member in the direction of the optical axis.

2. A lens barrel according to claim 1, wherein the base portion of the cam follower of the other of said first optical member and said second optical member is guided in the direction of the optical axis along the guide portion and one of the inner wall surfaces.

3. A lens barrel according to claim 1, wherein said second optical member is disposed on the subject side of said first optical member in the direction of the optical axis.

4. A lens barrel according to claim 1, wherein said first optical member and said second optical member are close to each other when the lens barrel is in a retracted state, and said first optical member and said second optical member are away from each other when the lens barrel is in a shooting state.

5. An image pickup apparatus with a lens barrel including a zoom mechanism that moves in a direction of an optical axis to change shooting magnifications when a state of the lens barrel changes between a shooting state and a retracted state, comprising the lens barrel according to claim 1 as the lens barrel.

* * * * *